March 29, 1927.
E. H. KENNEY ET AL
1,622,789
SLED AND WAGON
Filed April 14, 1925  2 Sheets-Sheet 2
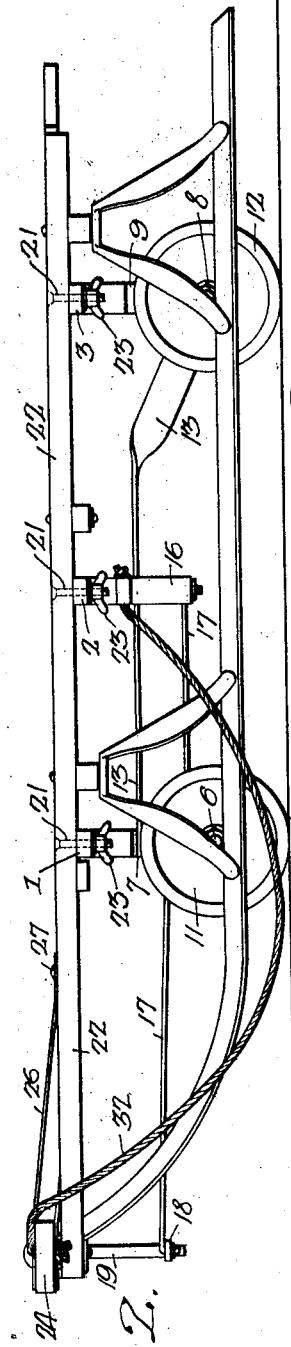
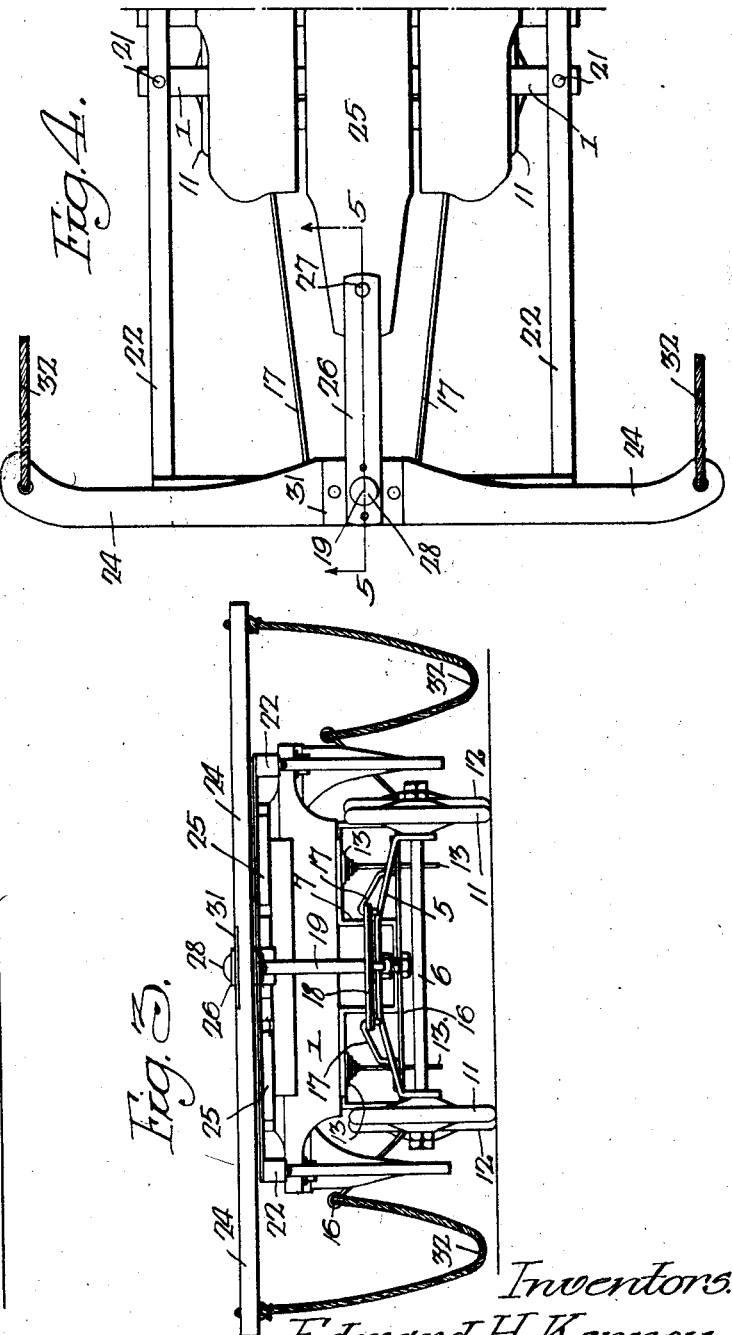
Inventors:
Edward H. Kenney,
Elizabeth Kenney.
by their Attorneys.
Howson & Howson Patented Mar. 29, 1927.

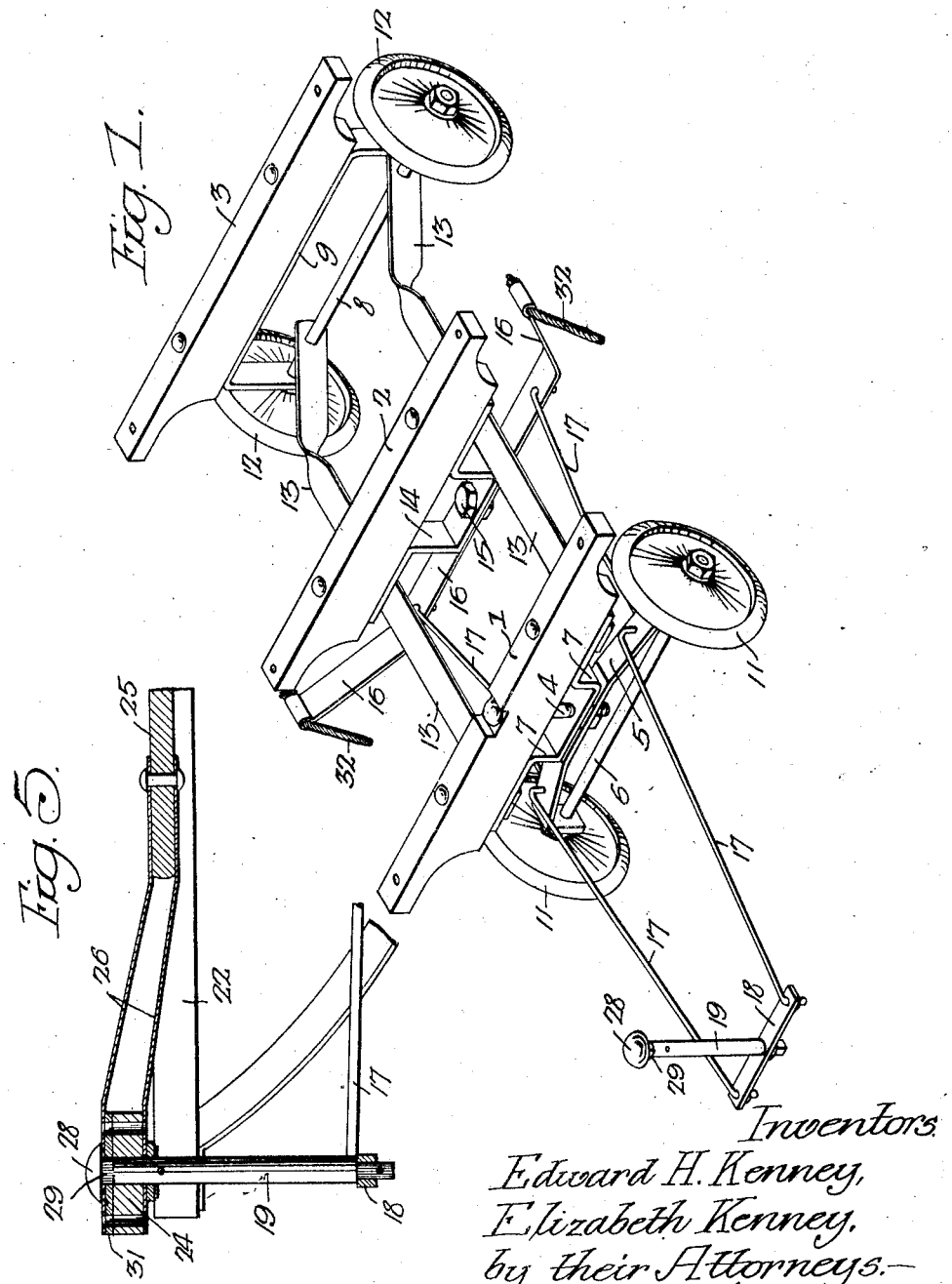

1,622,789

UNITED STATES PATENT OFFICE.

EDWARD H. KENNEY AND ELIZABETH KENNEY, OF PHILADELPHIA, PENNSYLVANIA.

SLED AND WAGON.

Application filed April 14, 1925. Serial No. 23,008.

This invention has for its principal object provision of a novel and practicable device in the nature of an attachment for converting sleds into wheeled vehicles.

More specifically, the invention contemplates the provision of a wheeled truck adapted for easy and quick attachment and detachment to and from a sled, the truck and sled together providing all the benefits both of sled and wagon at a cost little more than that for the sled alone.

Another object of the invention is to provide novel means for utilizing the normal sled steering means for directing the forward wheels of the truck.

A still further object of the invention is to provide auxiliary steering means for controlling the direction of the wheels from a point apart from the steering lever.

The invention further resides in novel and advantageous details of construction as hereinafter set forth and as illustrated in the attached drawings, in which:

Figure 1 is a view in perspective of the wheeled frame;

Fig. 2 is a side elevation of a sled with the wheeled frame attached;

Fig. 3 is a front elevation;

Fig. 4 is a plan view of the front of the combined vehicle, and

Fig. 5 is a section on the line 5—5, Fig. 4.

With reference to the drawings, the device comprises in a preferred form a wagon chassis or frame having three transverse bars, 1, 2 and 3, substantially the width of the sled with which the attachment is intended to be used. The bar 1 has secured thereto on the under side, by means of a bolt 4 which constitutes also a king pin having an auxiliary frame or a front axle structure comprising a bar 5 pivotally suspended from the pin 4, and an axle 6 mounted or journaled in the bar 5. The bar 1 also has secured to the under side thereof a downwardly offset bar 7 which constitutes a bearing for the bar 5.

The bar 3 carries the rear axle 8 mounted in a bar 9 secured to the under side of the bar 3. Wheels 11, 11, and 12, 12, are journaled, preferably on ball bearings, on the axles 6 and 8 respectively.

The bar 1 is connected to the rear axle 8 and to the bar 2 by two longitudinal bars 13, 13, which are secured to the under sides of the bars 1 and 2 and which bend down at the rear to the axle 8 which extends through holes therein. The bar 2 has also secured to the under side thereof a bar 14 having a central downturned offset to the under side of which is pivotally secured by a bolt 15 a transverse rod or bar 16. This bar 16 is connected to the bar 5 of the front axle structure by rods 17, 17 and these rods extend, in the present instance, forwardly to a guiding lever 18 and constitute directing mechanism for the auxiliary frame and the front wheels of the device. To the center of the guiding lever 18 is fixed an upstanding bolt 19 which at the top attaches to the steering lever of the sled, as hereinafter set forth.

The particular wheeled frame described above is adapted for use with a well known type of steering sled needing no description other than that incidental to the explanation of the manner of attaching and steering the wheeled frame.

As clearly shown in Figs. 2 and 3, the wheeled frame is secured by means of bolts 21 which pass through holes in the side bars 22 of the sled and through the ends of the bars 1, 2 and 3 of the wheeled frame, the frame being secured by means of wing nuts 23 on the lower threaded ends of the bolts. When thus secured to the under side of the sled, the latter is supported on the wheels 11 and 12 with the runners well above the supporting surface, and the sled thereby takes on all of the characteristics of a wagon.

The sled shown in the drawings is of the type provided with steering mechanism comprising a steering lever 24 pivotally secured at the front of the sled frame and normally connected with the body 25 by means of a connecting strap 26 rigidly secured to the lever 24 by means of bolts 24ª and pivotally connected at 27 to the body.

To provide for directing the front wheels 11, 11, of the wheeled frame when the latter is attached to the sled, we provide for removing the pin or bolt by means of which the lever 24 is normally pivoted to the frame and for releasing the strap 26 from the lever 24 by removing the bolts 24ª, and we thereafter replace the usual pivot pin or bolt with the bolt 19, which below its head 28 has a rectangular section 29, see Figures 1 and 5, which fits into a similarly shaped aperture in the lever 24, thereby preventing rotation of the bolt with respect to the lever. In order to strengthen the lever 24, we preferably provide a set-in metal plate 31 in which the rectangular hole for the correspondingly shaped portion 29 of the bolt 19 is formed. The hole in the strap 26 through which the bolt 19 passes is made round so that the bolt may turn freely with respect to the strap. Under these conditions and with the bolts which ordinarily secure the strap 26 to the lever 24 removed, it will be apparent that angular movement of the lever 24 will be transmitted through the bolt 19 to the lever 18 which, together with the bolt 19 forms a guiding element for the front wheels 11, 11, and angular movement of this lever results in a corresponding angular movement of the axle 6 around the king pin 4 through the rods 17, 17, which connect the axle and the said lever 18. Movement of the lever 24 under these conditions has no effect upon the sled, since the lever rotates freely with respect to the strap 26.

In order to provide for control of the front wheels 11, 11, from a point rearwardly of the steering lever 24, the ends of the bar 16 are turned upwardly so as to occupy a position easily grasped by the hands of one on the vehicle, and these turned-up ends of the bar 16 are connected with the ends of the lever 24 by means of flexible connectors 32. These flexible connectors provide for holding the front wheels 11, 11, straight when a child takes a running start, the connectors being pulled tight for example against the lever 24 and held by the hands gripping the side bars of the sled. After the vehicle is in motion, the steering may be done through the connectors 32 or through the lever 24 or arm 16.

It will be apparent that the device may be attached and detached to and from the sled with the utmost facility, and that the construction is strong and durable and extremely cheap to manufacture.

One of the advantages of the device resides in the fact that the runners of the sled prevent the vehicle passing down a curb and into the street, since as soon as the front wheels 11 have dropped over the curb, the runners come into contact with the edge of the curbing and act as a brake to bring the vehicle to a stop. This feature will be particularly desirable in cities and crowded sections, preventing possible accidents due to the vehicle passing from the sidewalk into the path of traffic in the street.

We claim:

1. An attachment, for a sled provided with a steering element, comprising a wheeled frame adapted to be secured to the under side of the sled body intermediate the runners of the sled, whereby the sled is supported with the runners in an elevated position; a pair of forward wheels and a pair of rear wheels mounted on the frame; and guiding means on said frame and adapted to be attached to the sled steering element for directing the forward wheels of the frame to direct the vehicle.

2. In a convertible vehicle comprising a sled and wagon, a sled body provided with runners and steering mechanism operatively associated with said body and said runners and having a steering lever included in the steering mechanism; the combination of detachable elements for connecting the said steering lever with the other elements of the steering mechanism of the sled, when the vehicle is functioning as a sled; a wheeled frame secured to the underside of the sled body between the sled runners; front and rear wheels mounted on said frame and adapted to maintain the runners of the sled in an elevated position, when the vehicle is functioning as a wagon; directing mechanism for the said wheels of the frame; and a guiding element adapted to be rigidly attached to the steering lever of the sled and operatively connected to the said directing mechanism for the wheels whereby the course of the vehicle may be directed when the vehicle is functioning as a wagon.

3. In a convertible vehicle comprising a sled and wagon, a sled body provided with runners and steering mechanism operatively associated with said body and said runners and having a steering lever included in the steering mechanism; the combination of detachable elements for connecting the said steering lever with the other elements of the steering mechanism of the sled, when the vehicle is functioning as a sled; a wheeled frame secured to the underside of the sled body between the sled runners; front and rear wheels mounted on said frame and adapted to maintain the runners of the sled in an elevated position, when the vehicle is functioning as a wagon said front wheels being movable, angularly, relative to said frame; directing mechanism for the said front wheels, and a guiding element adapted to be rigidly attached to the steering lever of the sled and operatively connected to the said directing mechanism whereby the course of the vehicle may be directed when the vehicle is functioning as a wagon.

4. In a convertible vehicle comprising a sled and wagon, a sled body provided with runners and steering mechanism operatively associated with said body and said runners and having a steering lever included in the steering mechanism; the combination of detachable elements for connecting the said steering lever with the other elements of the steering mechanism of the sled, when the vehicle is functioning as a sled; a wagon chassis secured to the underside of the sled body between the sled runners; an auxiliary frame pivoted to said wagon chassis; front wheels mounted on said auxiliary frame; a pair of wheels mounted on said wagon chassis adjacent the rear end thereof; directing mechanism for the said front wheels attached to the said auxiliary frame; a guiding element adapted to be rigidly attached to the steering lever of the sled and operatively connected to the said directing mechanism; and flexible elements attached to the steering mechanism whereby the course of the vehicle may be directed when the vehicle is functioning as a wagon.

EDWARD H. KENNEY.
ELIZABETH KENNEY.